(12) United States Patent
Ke

(10) Patent No.: US 9,125,348 B2
(45) Date of Patent: Sep. 8, 2015

(54) ECOLOGICAL MOBILE CONTAINER

(75) Inventor: Sizheng Ke, Shanghai (CN)

(73) Assignee: SHANGHAI ZHONGHUI ECO-TECHNOLOGY CO., LTD., Shanghai (CN)

( * ) Notice: Subject to any disclaimer, the term of this patent is extended or adjusted under 35 U.S.C. 154(b) by 186 days.

(21) Appl. No.: 13/980,859

(22) PCT Filed: Jan. 28, 2011

(86) PCT No.: PCT/CN2011/070750
§ 371 (c)(1),
(2), (4) Date: Jul. 19, 2013

(87) PCT Pub. No.: WO2012/100426
PCT Pub. Date: Aug. 2, 2012

(65) Prior Publication Data
US 2013/0298463 A1  Nov. 14, 2013

(51) Int. Cl.
*A01G 9/02* (2006.01)
*A01G 1/00* (2006.01)

(52) U.S. Cl.
CPC . *A01G 9/02* (2013.01); *A01G 1/007* (2013.01)

(58) Field of Classification Search
CPC .............................. A01G 1/007; A01G 1/002

USPC .......................... 47/65.5, 65.7, 65.9, 66.1, 79
See application file for complete search history.

(56) References Cited

U.S. PATENT DOCUMENTS

| | | | | |
|---|---|---|---|---|
| 5,467,555 A | * | 11/1995 | Ripley et al. | 47/65.9 |
| 7,596,906 B2 | * | 10/2009 | Gold | 47/65.9 |
| 8,479,443 B2 | * | 7/2013 | Buist | 47/65.9 |
| 2011/0289839 A1 | * | 12/2011 | Cronk et al. | 47/65.7 |

FOREIGN PATENT DOCUMENTS

| | | | | |
|---|---|---|---|---|
| DE | 3936264 A1 | * | 5/1991 | A01G 9/00 |
| WO | WO 2009155760 A1 | * | 12/2009 | A01G 9/02 |

* cited by examiner

*Primary Examiner* — Troy Chambers
*Assistant Examiner* — Danielle Clerkley

(57) ABSTRACT

An ecological mobile container includes a heat preservation layer, a drainage groove, a water storage layer, a root resistance layer, a drainage filter layer, a water transport pipe and enclosure panels. The water storage layer, the root resistance layer and the drainage filter layer sequentially stack on the heat preservation layer. The enclosure panels buckle on the top of a side frame of the water storage layer and form an open containing space. The water transport pipe inserts into the side frame along two diagonal through holes of the side frame. Because of the automatic drip irrigation system (the water transport pipe) through the middle of the container, the container can replenish water automatically.

6 Claims, 10 Drawing Sheets

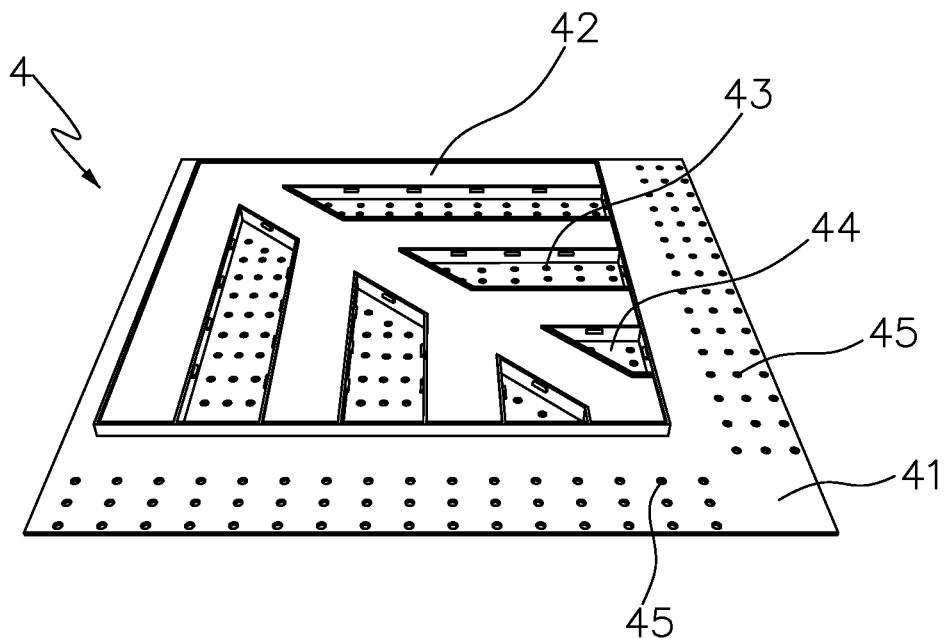
F I G. 8A
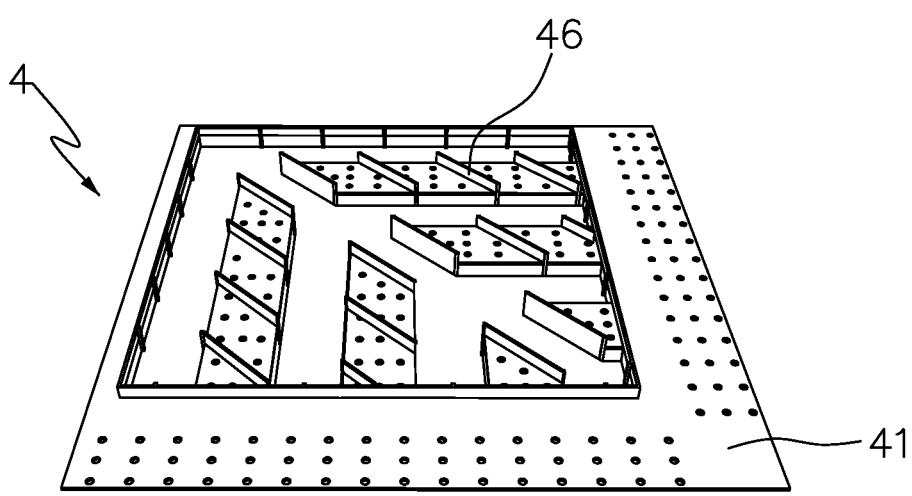
F I G. 8B

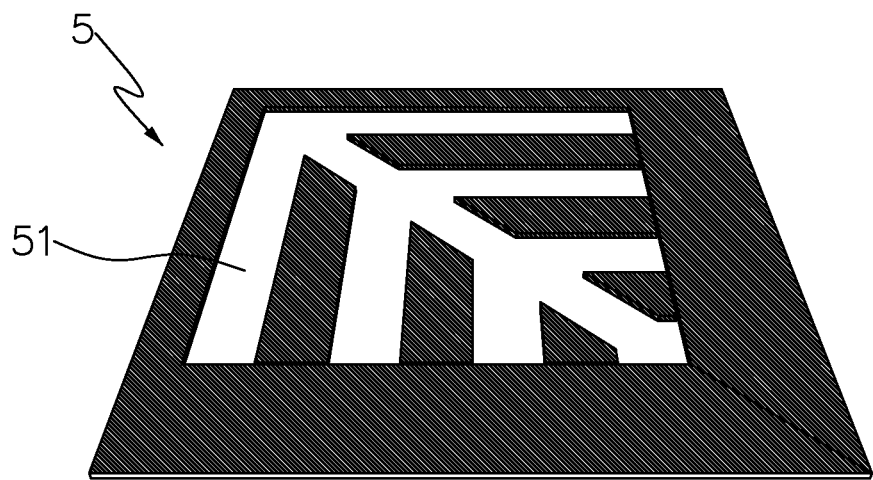
F I G. 9A
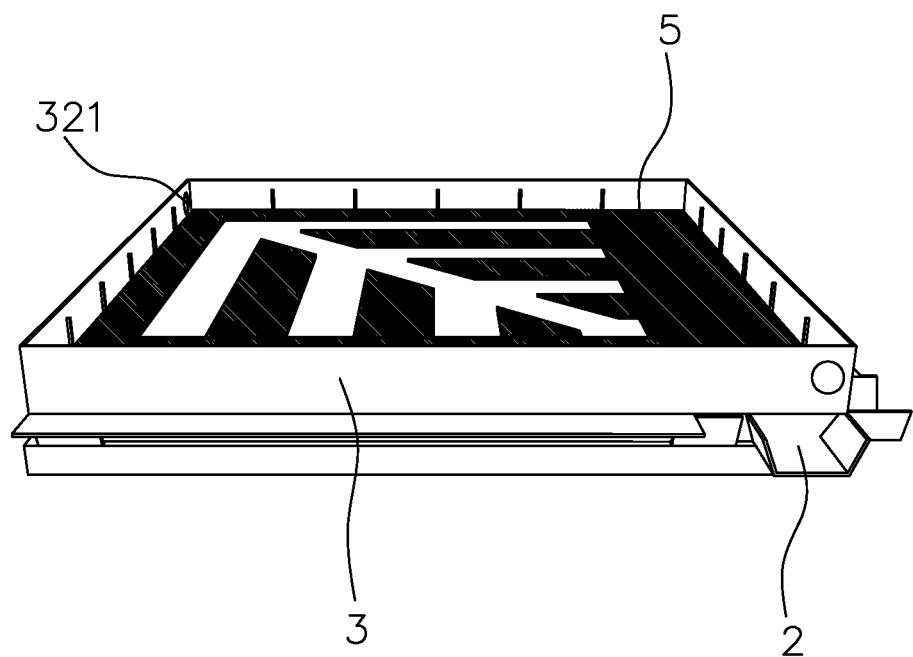
F I G. 9B

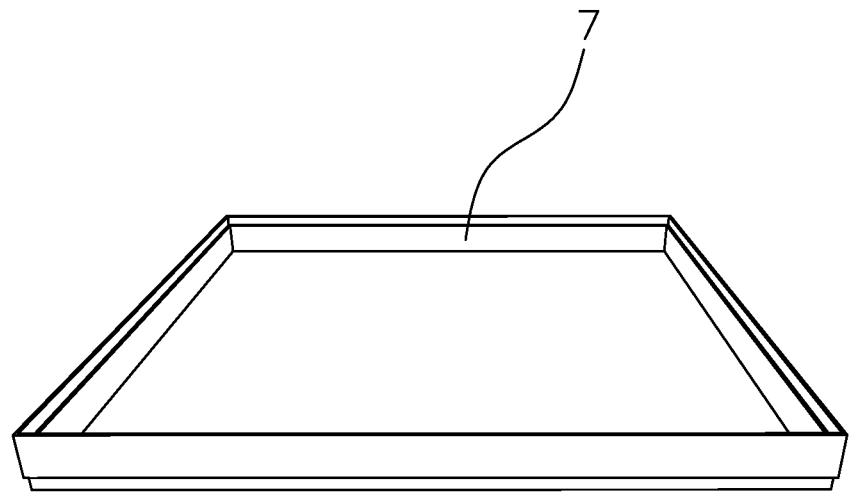
F I G. 10
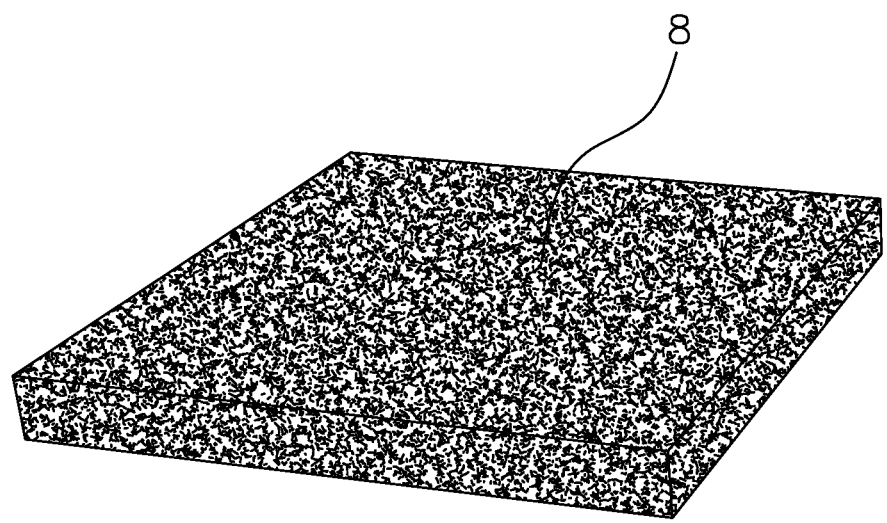
F I G. 11

ECOLOGICAL MOBILE CONTAINER

BACKGROUND OF THE INVENTION

1. Field of the Invention

The present invention relates to an ecological mobile container, and more particularly to an ecological mobile container used for a building, square, rod or the like to plant arbor, bush, lawn, vegetable and fruit.

2. Description of the Prior Art

A conventional container has a drainage system and a drainage passage at the lower portion thereof, and comprises a container body and a drainage root-resistance tray. The bottom of the container body has a drainage ventilation trough and a water storage trough. The drainage ventilation trough communicates with the exterior of the container body. The upper side wall of the water storage trough has a plurality of overflow openings which communicate with the drainage ventilation trough. The drainage root-resistance tray is located above the drainage ventilation trough and the water storage trough of the container body, and has a plurality of through holes corresponding in position to the water storage trough. Due to the design of the water storage trough, water must be stored in the water storage trough in advance, not drained direct. When the water in the water storage trough reaches the overflow openings, the water will be drained away through the overflow openings. Therefore, the bottom of the planting container always has water. Even if the water stored in the soil or the planting substance is evaporated, the water in the water storage trough will be transpired upward to supply water to the plant. This ensures normal growing of the plant and provides a heat preservation effect.

The conventional planting container has an intersected groove at the bottom of the container and water penetration holes above the groove to achieve drainage, ventilation and water storage effects of the container body. The planting substance and the plant don't have the heat preservation function. The container doesn't have an automatic irrigation system. The structure of the conventional planting container is simple. The cross spaced battens above the groove of a single container needs installation so it is inconvenient for assembly.

Accordingly, the inventor of the present invention has devoted himself based on his many years of practical experiences to solve these problems.

SUMMARY OF THE INVENTION

The primary object of the present invention is to provide an ecological mobile container which provides a better heat preservation effect and can irrigate automatically.

In order to achieve the aforesaid object, the ecological mobile container of the present invention comprises a heat preservation layer, a drainage groove, a water storage layer, a root resistance layer and a drainage filter layer. The heat preservation layer is located the lowest layer of the ecological mobile container. The water storage layer, the root resistance layer and the drainage filter layer sequentially stack on the heat preservation layer. The drainage groove is mounted at the side of the heat preservation layer. The water storage layer comprises a water storage base, a side frame, a water storage trough, overflow openings and drain holes. The side frame is composed of four side walls. The four side walls are disposed around the water storage base to form a circumambient frame.

Preferably, the ecological mobile container further comprises an enclosure panel. The enclosure panel is buckled on the top of the side frame of the water storage layer to form an open containing space.

Preferably, the ecological mobile container further comprises a water transport pipe. The side frame has two diagonal through holes for insertion of the water transport pipe. The water transport pipe is inserted into the side frame along the two diagonal through holes of the side frame. The water transport pipe has a plurality of irrigation holes thereon.

Preferably, the heat preservation layer comprises a heat insulation base, an inner frame and two side boards. The inner frame has a rectangular shape and is installed on an upper surface of the heat insulation base. A distance is defined between two sides of the inner frame and the side edge of the heat insulation base to form the two side boards. The drainage groove has two sections respectively mounted on the two side boards of the heat insulation base of the heat preservation layer. The two sections of the drainage groove is intersected.

Preferably, the root resistance layer comprises a root resistance base, a water transport platform, a water storage hole, a root resistance filter trough and water penetration holes. The water transport platform, the water storage hole, the root resistance filter trough and the water penetration holes are disposed on the root resistance base.

Preferably, the drainage filter layer has water passages corresponding to the water transport platform, the water storage hole and the root resistance filter trough of the root resistance layer.

Preferably, the ecological mobile container further comprises a planting substance layer. The planting substance layer is placed in the containing space defined by the enclose panel and the side frame of the water storage layer.

Accordingly, the present invention has seven subsystems installed together, comprising a building thermal insulation material as the heat preservation layer. The material of the heat preservation layer is made of a high-density building thermal insulation material which is an excellent heat insulation material and has the advantages of high density, sound insulation, being nonflammable, non-toxic and harmless. The automatic drip irrigation system (the water transport system) is inserted through the container to supply water automatically. The present invention has the interconnected drain grooves at two sides thereof. Several planting containers are connected together to achieve the combination. Water is drained in all directions. The structure is simpler and the production efficiency is elevated and the cost of production is reduced.

Furthermore, the present invention comprises a planting substance and plants. After a test, the planting substance is light and nutritious. According to the temperature of 60-70° C. in summer and the temperature of 10° C. in winter at different areas under different climate conditions, the plants are drought-resistant, heat-resistant, fertile-resistant to keep green throughout the year. The present invention can be widely used for buildings and has the advantages, such as environmental protection, energy-saving, reducing building consumption, improving the environment of the building, reducing environment pollution, carbon sequestration, increasing green ratio, protecting the building from being damaged, prolonging the service life of the building, and so on. The present invention is an innovative energy-saving system for buildings. The heat preservation material is not poison, without pollution. The container is novel and can store a great deal of water and drain the surplus rainwater quickly. Under rainstorm, the well-drained planting substance can drain water through the water passages. The system is able to resist a typhoon. The planting substance not having soil is prepared according to the property of the plant, which can conserve water and is nutritious. The planting substance is able to store a great deal of rainwater. The green system further comprises an automatic drip irrigation system for supplying the required water to the plant. When the weather is hot, the present invention can lower the temperature of the building about 4-5 degrees and lower 80% of the heat transmission of the roof to save 0.2 degree electricity each square meter every day. The ecological mobile container of the present invention is an innovative system for buildings.

BRIEF DESCRIPTION OF THE DRAWINGS

FIG. 8A is a top view showing the root resistance layer of the present invention;

FIG. 8B is a bottom view showing the root resistance layer of the present invention;

FIG. 9A is a perspective view showing the drainage filter layer of the present invention;

FIG. 9B is a perspective view showing the installation of the drainage filter layer of the present invention;

FIG. 10 is a perspective view showing the enclose panels of the present invention;

FIG. 11 is a perspective view showing the planting substance layer of the present invention;

DETAILED DESCRIPTION OF THE PREFERRED EMBODIMENTS

Embodiments of the present invention will now be described, by way of example only, with reference to the accompanying drawings.

Figure 1:
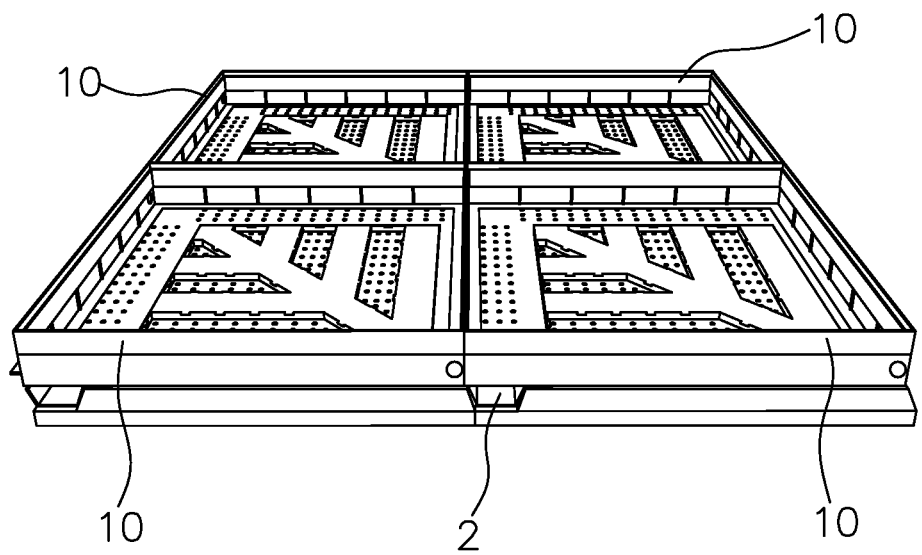
FIG. 1 is a perspective view of the present invention after assembled.
Figure 2:
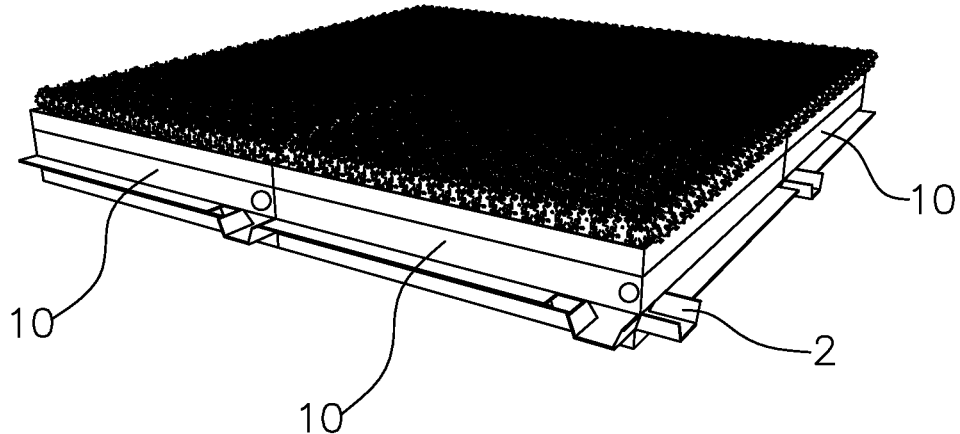
FIG. 2 is a perspective view of the present invention after assembled when in use.

As shown in FIG. 1 and FIG. 2, the ecological mobile container of the present invention is composed of four planting containers 10. The four planting containers 10 are interconnected, with the outlets of drain grooves in all directions.

Figure 3:
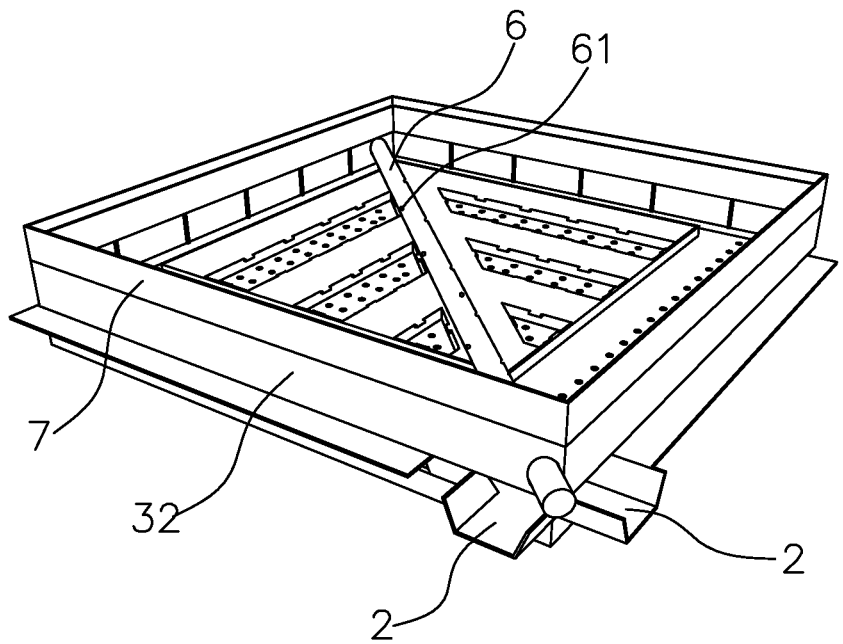
FIG. 3 is a perspective view of the present invention.
Figure 5:
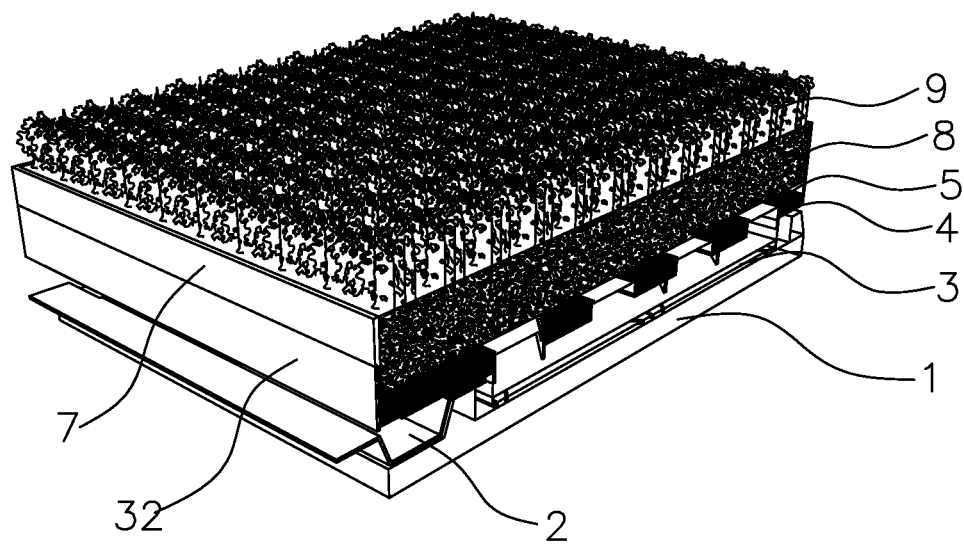
FIG. 5 is a sectional view of the present invention when in use.

As shown in FIG. 3 and FIG. 5, the ecological mobile container 10 comprises a heat preservation layer 1, a drainage groove 2, a water storage layer 3, a root resistance layer 4, a drainage filter layer 5, a water transport pipe 6, enclosure panels 7, and a planting substance layer 8.

The heat preservation layer 1 is located the lowest layer of the ecological mobile container 10. The water storage layer 3, the root resistance layer 4 and the drainage filter layer 5 sequentially stack on the heat preservation layer 1. The drainage groove 2 is mounted at the side of the heat preservation layer 1. The thickness of the heat preservation layer 1 can be adjusted according to the building and the climate.

Figure 7A:
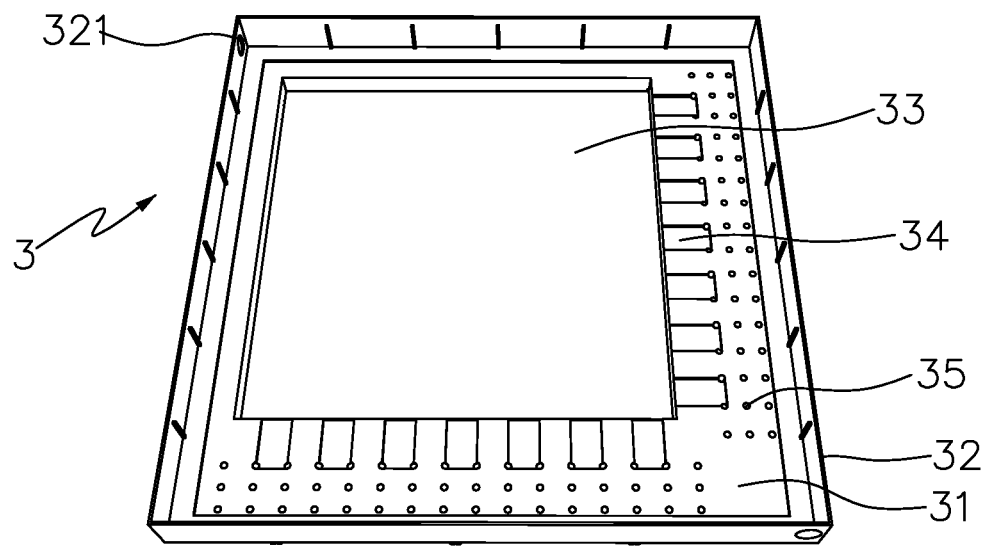
FIG. 7A is a top view showing the water storage layer of the present invention.
Figure 7B:
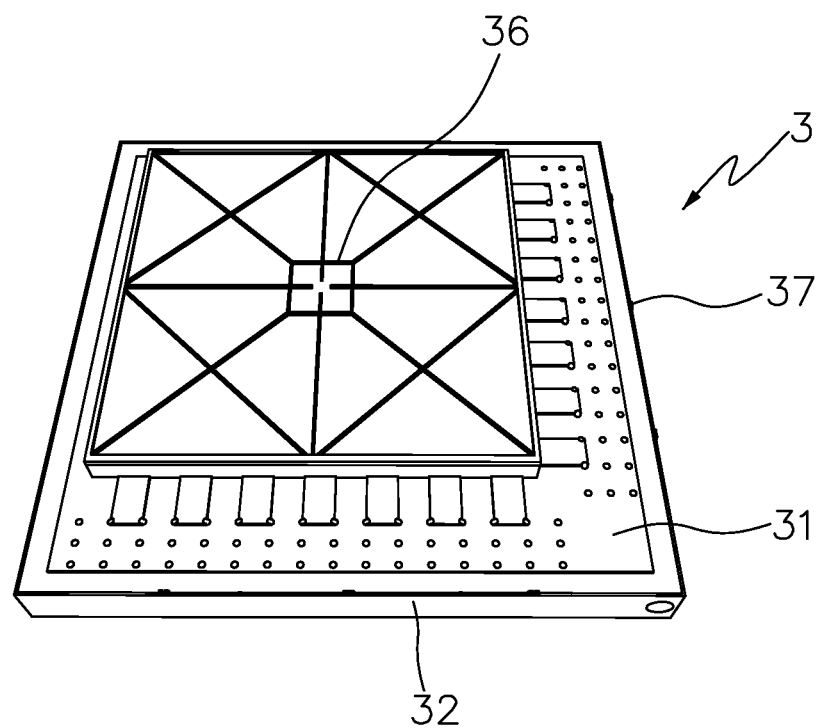
FIG. 7B is a bottom view showing the water storage layer of the present invention.

As shown in FIG. 7A and FIG. 7B, the water storage layer 3 comprises a water storage base 31, a side frame 32, a water storage trough 33, overflow openings 34, and drain holes 35. The water storage trough 33, the overflow openings 34 and the drain holes 35 are disposed on the water storage base 31. The side frame 32 is composed of four side walls. The four side walls are disposed around the water storage base 31 to form a circumambient frame. The side frame 32 has two diagonal through holes 321 for insertion of the water transport pipe 6. The bottom of the water storage layer 3 is provided with a reinforcement rib 36 and an engaging buckle 37.

The water storage layer 3 is mounted on top of the heat preservation layer 1, referring to FIG. 3. The middle portion of the water storage layer 3 is to storage water. The surplus water is drained through the strip water storage trough 33 and the circular drain holes 35 located at the concave portion at the two ends of the left side, as shown in the drawing.

As shown in FIG. 3, the enclosure panels 7 (as shown in FIG. 10) are buckled on the top of the side frame 32 of the water storage layer 3 to form an open containing space. The water transport pipe 6 is inserted into the side frame 32 along the two diagonal through holes 321 of the side frame 32. The water transport pipe 6 has a plurality of irrigation holes 61 thereon. The planting substance layer 8, as shown in FIG. 11, is placed in the containing space defined by the enclose panels 7 and the side frame 32 of the water storage layer 3. The enclose panels 7 are used to contain more planting substance layers 8 for the required base thickness of different plants.

Figure 6A:
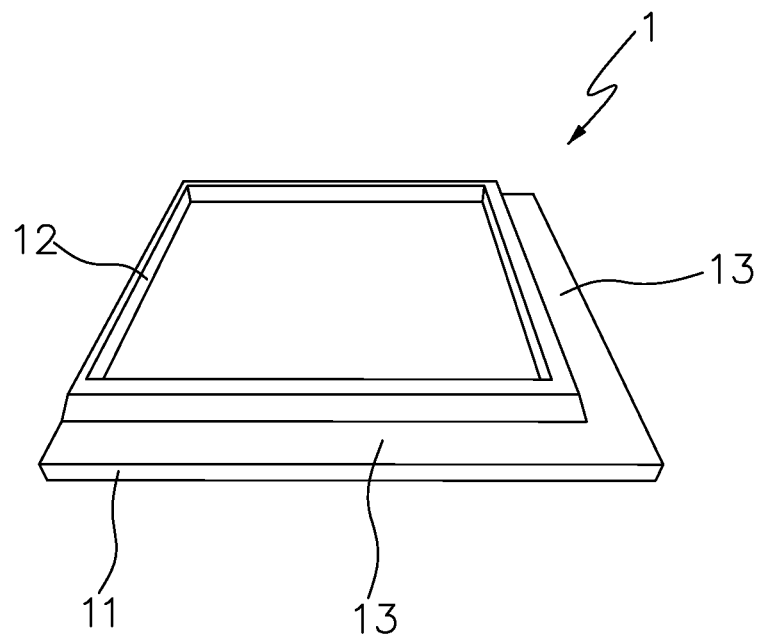
FIG. 6A is a perspective view showing the heat preservation layer of the present invention.
Figure 6B:
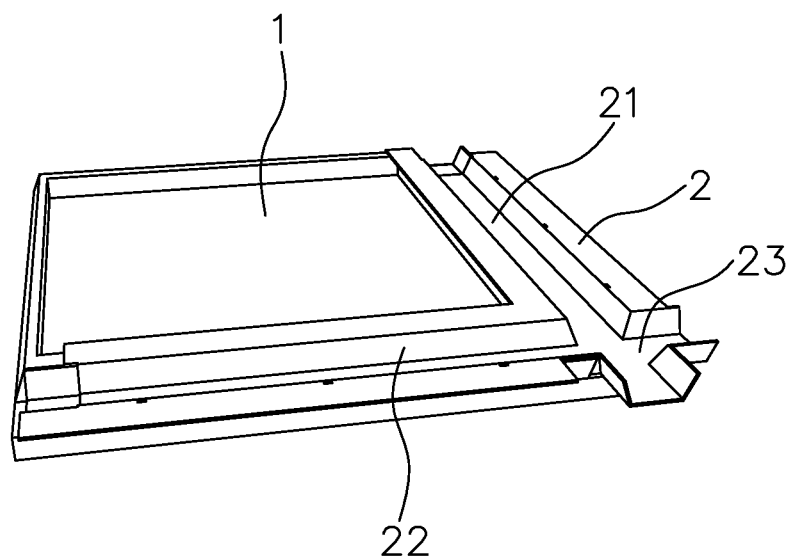
FIG. 6B is a perspective view showing the heat preservation layer and the drain is groove of the present invention.
Figure 6C:
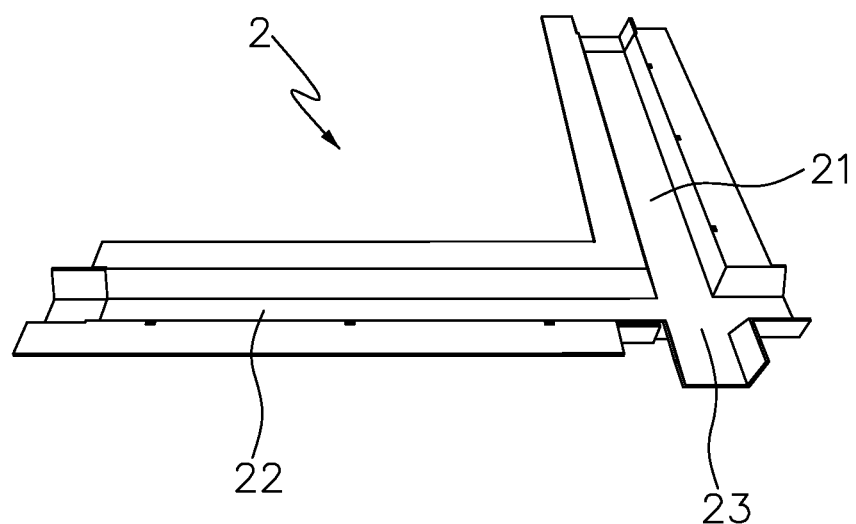
FIG. 6C is a perspective view showing the drain groove of the present invention.
Figure 6D:
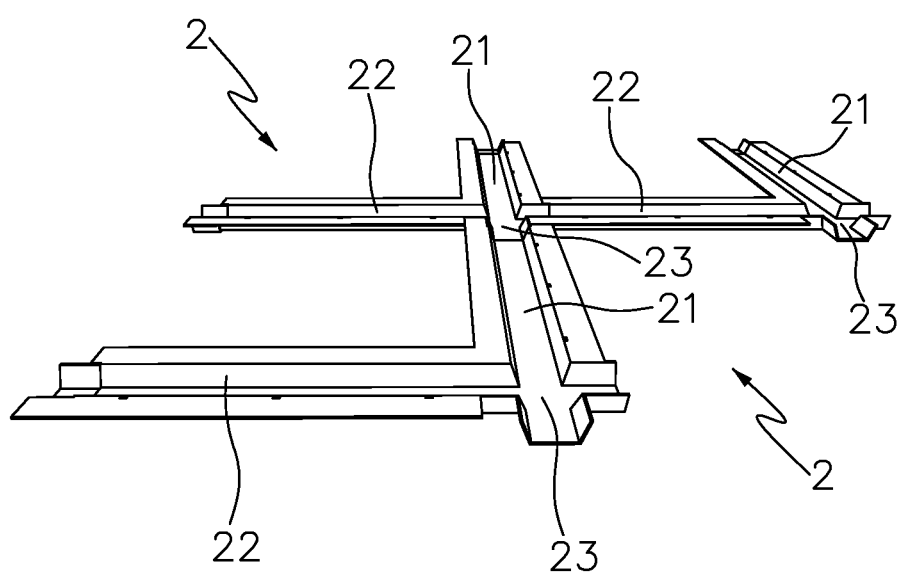
FIG. 6D is a perspective view showing the interconnected drain grooves of the present invention.

As shown in FIG. 6A to FIG. 6C, the heat preservation layer 1 comprises a heat insulation base 11, an inner frame 12 and two side boards 13. The rectangular inner frame 12 is installed on an upper surface of the heat insulation base 11. A certain distance is defined between two sides of the inner frame 12 and the side edge of the heat insulation base 11 to form the two side boards 13. The drainage groove 2 has two sections 21, 22 which are respectively mounted on the two side boards 13 of the heat insulation base 11 of the heat preservation layer 1. The two sections 21, 22 of the drainage groove 2 are intersected to form a cross 23 for communicating with the drainage grooves 2 of the other containers, referring to FIG. 6D, to achieve the drainage at the two sides of the container.

As shown in FIG. 8A, the root resistance layer 4 comprises a root resistance base 41, a water transport platform 42, a water storage hole 43, a root resistance filter trough 44, and water penetration holes 45. The water transport platform 42, the water storage hole 43, and the root resistance filter trough 44 are disposed on the root resistance base 41. The root resistance layer 4 is mounted on top of the water storage layer 3, referring to FIG. 3. The water storage hole 43 and the root resistance filter trough 44 are adapted to receive water for entering the underneath water storage layer 3 and to stop root and filter. The water penetration holes 35 at two sides are for penetration of water. The bottom of the root resistance layer 4 is provided with reinforcement feet to bear and enhance connection of two layers. As shown in FIG. 8B, the bottom of the root resistance base 41 is provided with reinforcement ribs 46.

As shown in FIG. 9A, FIG. 9B and FIG. 8A, the drainage filter layer 5 has water passages 51 corresponding to the water transport platform 42, the water storage hole 43 and the root resistance filter trough 44 of the root resistance layer 4. The drainage filter layer 5 is mounted on top of the root resistance layer 4, referring to FIG. 3 to enhance the drainage, filter and root resistance functions of the container.

Figure 4:
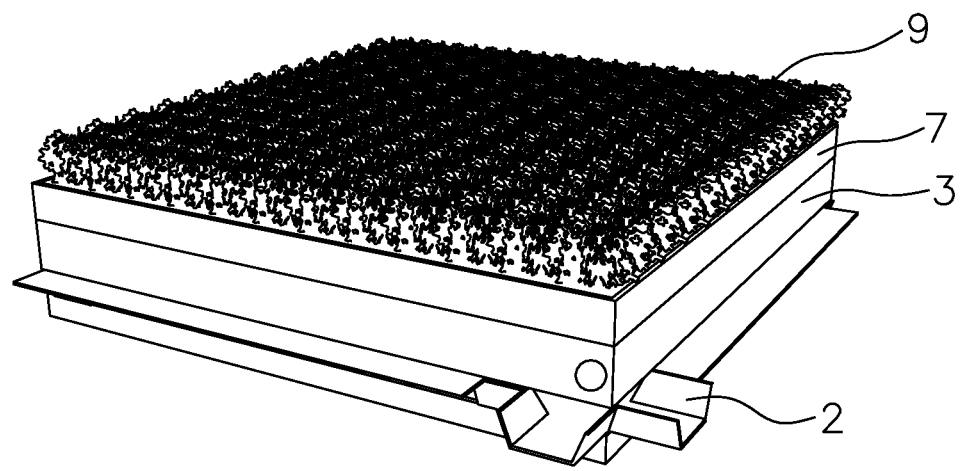
FIG. 4 is a perspective view of the present invention when in use.
Figure 12:
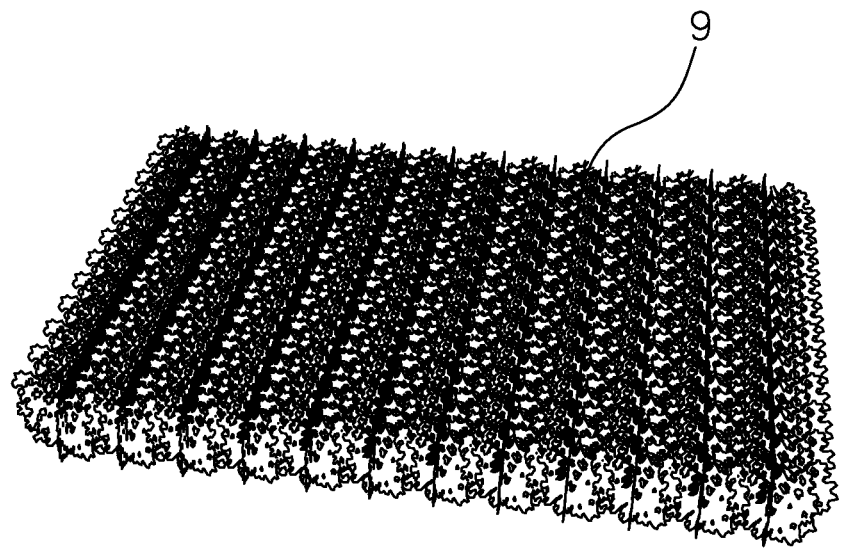
FIG. 12 is a perspective view showing the plant of the present invention.

As shown in FIG. 4 and FIG. 12, the planting container 10 is planted with a plant 9 which is drought-resistant and cold-resistant.

Figure 13:
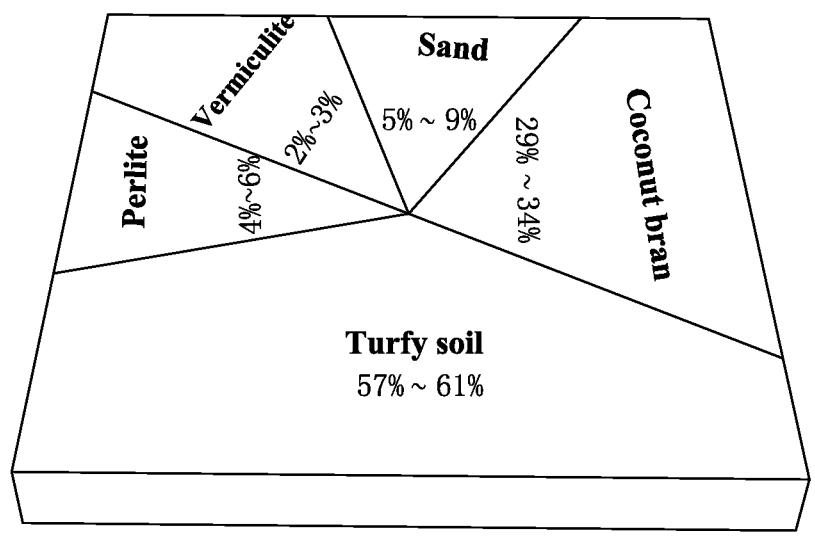
FIG. 13 is a schematic view showing the planting substance layer of the present invention.

As shown in FIG. 13, the planting substance layer 8 is composed of 57% turfy soil, 30% coconut bran, 6% sand, 2.2% vermiculite and 4.8% perlite.

To assemble the present invention, as shown in FIG. 3 and FIG. 5, the two sections 21, 22 of the drain groove 2 is disposed on two sides of the heat preservation layer 1 and interconnected. The water storage layer 3 is placed on top of the heat preservation layer 1. Two sides of the water storage layer 3 have the overflow openings 34 and the drain holes 35. The upper end of the water storage layer 3 has water storage, drainage and filter layers to provide drainage and filter and root resistance functions. The bottom is provided with reinforcement ribs to bear and enhance connection of the water storage layer and its upper layer. The root resistance layer 4 is placed on top of the water storage layer 3. The middle of the root resistance layer 4 has the water storage hole 43 to store the surplus water. This layer has root resistance and filter functions. Finally, the water transport pipe 6 is inserted along the diagonal of the water storage layer 3. Two sides of the water transport pipe 6 have the irrigation holes 61. When there is no rain for a long time, the water transport pipe 6 can irrigate the plant automatically to ensure water supply. Finally, based on interconnection of all the layers, the ensure panels 7 are installed according to the thickness of the planting substance layer to enhance the connection of all the layers. The height of the enclose panels 7 is selectively changed according to the plants and the thickness of the planting substance layer. The enclose panels 7 are higher than all the layers to contain the planting substance layer for growing the plant. The height of the enclose panels is dependent on the thickness of the planting substance layer. The drain grooves of the containers are intersected to achieve connection of the containers.

The present invention solves the following problems: 1. load-bearing of the roof; 2. waterproof, drainage and water supply; 3. preventing the root of the plant from penetrating the roof; 4. ensuring the growing of the plant (the prescription of the planting substance layer, nutrition, water supply and plant selection; 5. cost; 6. heat preservation, heat insulation and sound insulation.

The conventional technique is aimed at afforestation for a roof, not direct for building afforestation and energy-saving. Besides, the roof afforestation can only solve one, two or three problems, not giving consideration to other problems. For example, the user may only consider the problems of the load-bearing, waterproof and drainage for the roof, without considering the maintenance of the plants and the cost.

The present invention not only solves the foresaid problems but also achieves other functions, such as carbon sequestration, keeping rain, increasing green ratio, improving the environment of the building, energy-saving, environmental protection, and so on. The present invention is an innovative energy-saving system for buildings. The heat preservation material is not poison, without pollution. The present invention not having planting soil substance won't cause a burden to the roof. The container has five layers so it can prevent water leakage and root penetration. The container has special drainage passages to solve the problem of drainage and has a drip irrigation system to solve the problem of irrigation. According to the record, observation and adjustment at different areas and under different climate conditions for five years, the ingredients and ratio of the planting substance is the best substance for plants. However, the cost is slightly high compared to the other products on the market.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An ecological mobile container, comprising a heat preservation layer, a drainage groove, a water storage layer, a root resistance layer and a drainage filter layer; the heat preservation layer being located the lowest layer of the ecological mobile container, the water storage layer, the root resistance layer and the drainage filter layer sequentially stacking on the heat preservation layer; the drainage groove being mounted at a side of the heat preservation layer; the water storage layer comprising a water storage base, a side frame, a water storage trough, overflow openings and drain holes, the side frame being composed of four side walls, the four side walls being disposed around the water storage base to form a circumambient frame, further comprising a water transport pipe, the side frame having two diagonal through holes for insertion of the water transport pipe, the water transport pipe being inserted into the side frame along the two diagonal through holes of the side frame, the water transport pipe having a plurality of irrigation holes thereon.

2. An ecological mobile container, comprising a heat preservation layer, a drainage groove, a water storage layer, a root resistance layer and a drainage filter layer; the heat preservation layer being located the lowest layer of the ecological mobile container, the water storage layer, the root resistance layer and the drainage filter layer sequentially stacking on the heat preservation layer; the drainage groove being mounted at a side of the heat preservation layer; the water storage layer comprising a water storage base, a side frame, a water storage trough, overflow openings and drain holes, the side frame being composed of four side walls, the four side walls being disposed around the water storage base to form a circumambient frame, wherein the heat preservation layer comprises a heat insulation base, an inner frame and two side boards; the inner frame having a rectangular shape and being installed on an upper surface of the heat insulation base, a distance being defined between two sides of the inner frame and a side edge of the heat insulation base to form the two side boards; the drainage groove having two sections respectively mounted on the two side boards of the heat insulation base of the heat preservation layer, the two sections of the drainage groove being intersected.

3. An ecological mobile container, comprising a heat preservation layer, a drainage groove, a water storage layer, a root resistance layer and a drainage filter layer; the heat preservation layer being located the lowest layer of the ecological mobile container, the water storage layer, the root resistance layer and the drainage filter layer sequentially stacking on the heat preservation layer; the drainage groove being mounted at a side of the heat preservation layer; the water storage layer comprising a water storage base, a side frame, a water storage trough, overflow openings and drain holes, the side frame being composed of four side walls, the four side walls being disposed around the water storage base to form a circumambient frame, wherein the root resistance layer comprises a root resistance base, a water transport platform, a water storage hole, a root resistance filter trough and water penetration holes; the water transport platform, the water storage hole, the root resistance filter trough and the water penetration holes being disposed on the root resistance base.

4. The ecological mobile container as claimed in claim 1, wherein the drainage filter layer has water passages corresponding to a water transport platform, a water storage hole and a root resistance filter trough of the root resistance layer.

5. The ecological mobile container as claimed in claim 2, wherein the drainage filter layer has water passages corresponding to a water transport platform, a water storage hole and a root resistance filter trough of the root resistance layer.

6. The ecological mobile container as claimed in claim 3, wherein the drainage filter layer has water passages corresponding to a water transport platform, a water storage hole and a root resistance filter trough of the root resistance layer.

\* \* \* \* \*